United States Patent Office 3,448,083
Patented June 3, 1969

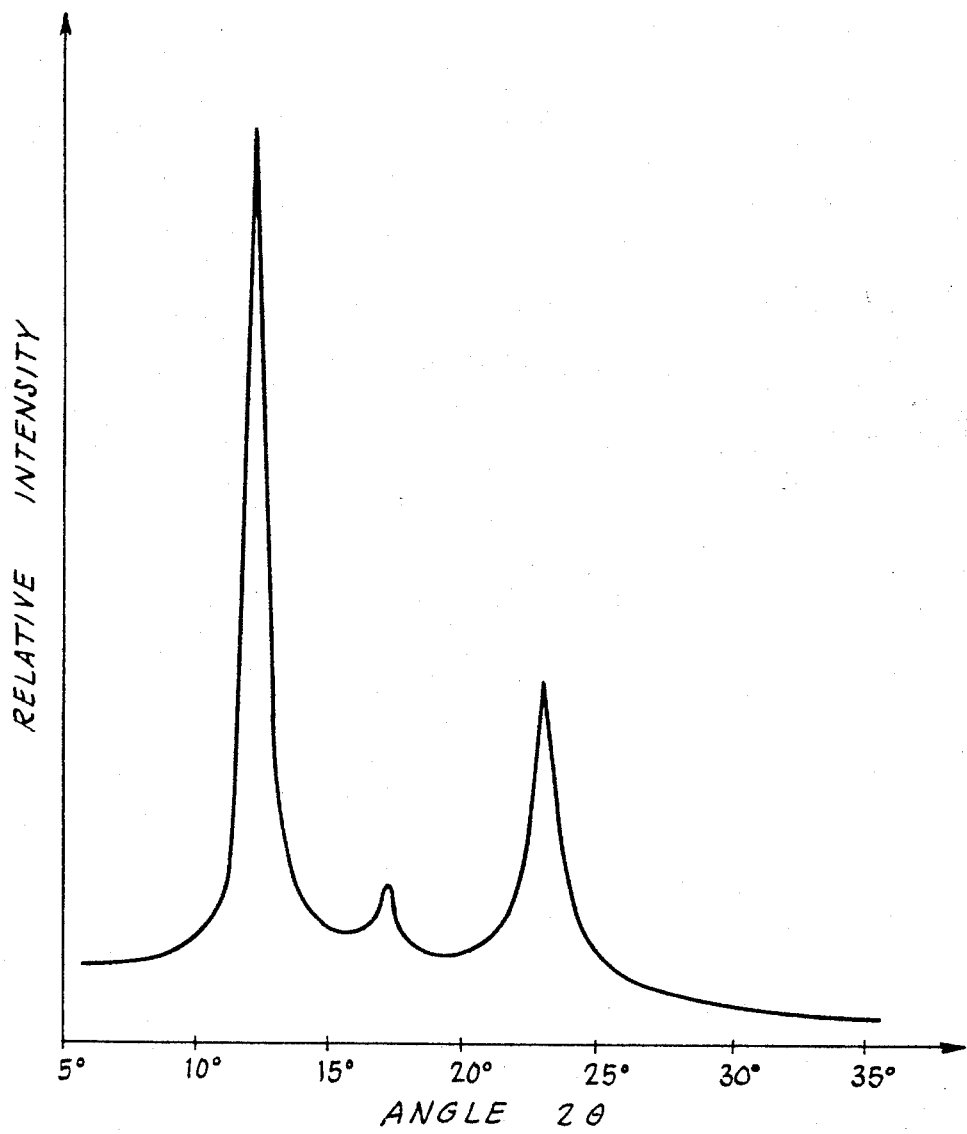

3,448,083
PRODUCTION OF HIGH MOLECULAR WEIGHT ACETALDEHYDE FORMALDEHYDE POLYMERS
Giulio Natta, Paolo Chini, Giorgio Mazzanti, and Amelia Brizi, Milan, Italy, assignors to Montecatini Edison S.p.A., Milan, Italy
Filed Nov. 21, 1960, Ser. No. 70,620
Claims priority, application Italy, Nov. 24, 1959, 19,565/59
Int. Cl. C08g 1/10
U.S. Cl. 260—67          11 Claims

ABSTRACT OF THE DISCLOSURE

High molecular weight, linear homopolymers of acetaldehyde and copolymers of acetaldehyde with formaldehyde are produced by polymerizing the monomer or mixed monomers in contact with catalysts comprising organometallic compounds or hydride of Group II or Group III metals.

---

The present invention relates to new crystalline linear homopolymers of acetaldehyde, high molecular weight linear copolymers of acetaldehyde with formaldehyde and to processes for preparing these polymers.

The preparation of high molecular weight armorphous homopolymers of acetaldehyde using the solid monomer is known. However, even when using in these known processes, wherein operating temperatures lower than the solidification temperature (−123° C.) of acetaldehyde are maintained, an acetaldehyde material possessing oriented crystals, the polymer obtained is amorphous.

It has been discovered recently that it is also possible to prepare amorphous high homopolymers of acetaldehyde at temperatures of about −80° C., by using boron trifluoride or ammonium persulphate as the catalyst (M. Letort, Compt. Rend. July 6, 1959) or by condensing acetaldehyde vapours on alumina at −80° C. (J. Furukawa et al., Makromol. Chem., 33, 32 (1959)).

The polymerization in the presence of boron trifluoride has two distinct disadvantages in that trimers and tetramers of acetaldehyde are produced in addition to the high molecular weight linear homopolymers and, also small variations in the amount of catalyst used can direct the polymerization reaction completely toward the formation of these trimers and tetramers.

The use of ammonium persulphate, on the other hand, produces only relatively low monomer conversion rates even after long polymerization times.

The process involving the use of alumina requires operation under special conditions, which are expensive and not practical, such as those required for the condensation of gaseous acetaldehyde on the alumina at a very low temperature. Though the polymers thus obtained using alumina are prepared on a solid catalyst, they are amorphous and have elastomeric properties.

It has now surprisingly been found, according to an aspect of the present invention, that organometallic compounds of certain metals can catalyze the polymerization of acetaldehyde so that high molecular weight linear polymers are formed. In another aspect of the present invention, there is achieved to production of crystalline acetaldehyde polymers not heretofore known. These results are even more surprising when one considers that, according to the literature (J. Furukawa et al., supra), organometallic compounds, such as diethyl zinc, can not promote the polymerization of acetaldehyde.

More particularly, it has been found that by treating liquid acetaldehyde at temperatures of from −50° C. to −100° C. with organometallic compounds or hydrides of the elements of Groups II or III of the Mendeleeff Periodic Table, the formation of high molecular weight linear polymers takes place.

It is therefore an object of the present invention to provide a process for preparing high molecular weight linear homopolymers of acetaldehyde, having a polyacetalic structure, and copolymers thereof with formaldehyde, wherein the monomer or monomers are contacted, at a temperature of from −50° C. to −100° C., with a catalyst comprising an organometallic compound or hydride of an element of Group II or III of the Mendeleeff Periodic Table.

Obviously, it is intended that the catalysts of the present invention include those compounds which contain both metal-to-hydrogen bonds and metal-to-carbon bonds.

All the valencies but one of the metal in the organometallic compound or the hydride can be satisfied by halogen atoms or alkoxy groups.

Particularly useful catalysts are the aryls, alkyls, hydrides, alkylhydrides, alkyl-halides and alkoxy-alkyls of elements such as Be, Mg, Ca, Zn, Cd, Al and B and complexes of these compounds, with ethers.

The following compounds are some examples of catalysts which may be used according to the preent invention: $Be(_2H_5)_2$, $C_2H_5$-Mg-Br, $C_6H_5$-Mg-Br, $(C_2H_5)_2Mg \cdot O(CH_3)_2$, $C_2H_5Mg$-Br·$O(C_2H_5)_2$, $Zn(C_4H_9)_2$, $Zn(C_2H_5)I$, $Cd(C_2H_5)_2$, $Hg(C_6H_5)_2$, $CaH_2$, $Al(C_2H_5)_3$, $Al(C_2H_5)_3 \cdot O(C_2H_5)_2$, $Al(C_2H_5)_2Cl$, $Al(C_2H_5)Cl_2$, $Al(C_2H_5)_2H$, $Al(C_2H_5)_2OC_2H_5$ and $$Al(C_6H_5)_3 \cdot O(C_2H_5)_2$$

The polymerization can be carried out either in the presence of, or in the absence of a diluent which will not docompose the catalysts and which will not react with the monomer under the polymerization conditions. Compounds such as aliphatic hydrocarbons, aromatic hydrocarbons, halogen derivatives and ethers are some examples of such diluents.

At the termination of the polymerization, it is often desirable to add a solvent, e.g., acetone, which contains a small amount of a substance capable of neutralizing any acids present and which may also contain a stabilizer such as phenyl-beta-naphthylamine.

Infra-red spectrographic examination carried out on the polymers of the present invention confirms that they possess a structure of the polyacetalic type, which can be indicated by the following formula:

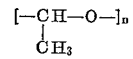

in which $n$ represents the number of recurring units.

The polymers of the present invention are linear and solutions of these polymers have a high viscosity.

Intrinsic viscosity measurements show that the average molecular weight of these polymers can reach several hundreds of thousands.

Moreover, it has been found that, in general, by the use of the catalysts of the present invention, polymers can be obtained which differ considerably in their physical properties from all acetaldehyde polymers previously known. In general, by using the aforementioned catalysts, crude polymers are formed which are at least partially insoluble in certain oxygen-containing solvents, such as acetone and ether, in contrast with the solubility of previously known linear acetaldehyde polymers in these solvents.

More over, these insoluble polymer fractions also have different physical properties. They are harder and they can be shaped by hot compression moulding like thermoplastic resins. These polymer fractions do not exhibit (or only to a lesser extent, such as at high temperature) the elastomeric properties which are characteristics of high molecular weight fractions of amorphous linear acetaldehyde polymers.

The linear strdructure and the low second order transition temperature of these polymers makes it possible to orient their macromolecules in a permanent way when hot pressed specimens are subjected to roll milling or to mechanical stretching.

The specimens thus oriented have a high tensile strength in the direction of stretching.

The properties of these polymers are due to the fact that, besides being linear like certain other already known acetaldehyde polymers, and in addition to having an analogous polyacetalic chemical structure these polymers, have a particular conformation of the main polymer chain which renders them crystallizable, as indicated by X-ray examination. The X-ray examination in fact shows the presence of an isotactic structure in the polyacetalic chain of the crystallizable acetaldehyde polymers prepared according to the present invention.

These acetaldehyde polymers, which are not extractable with boiling acetone, can be considered to consist of macromolecules in which the tertiary carbon atoms of successive monomeric units have the same steric configuration, that is, of macromolecules which show isotactic stereoregular structure.

Prior to the present invention, no catalytic process causing the stereospecific polymerization of acetaldehyde was known and the existence of such a process could not have been predicted from the then available information.

The amount of crystalline polymers which is present in the crude polymerization product produced according to the present invention depends, other conditions being equal, on the type of catalyst used.

For instance, of the three catalysts $Al(C_2H_5)_3$, $Al(C_2H_5)_2Cl$ and $Al(C_2H_5)Cl_2$ used when operating as described in the following Examples 1, 3 and 5; the first catalyst yields high amounts of crystalline polymers, the second gives small amounts of crystalline products and the third catalyst yields a substantially amorphous polymer.

As stated above, the new crystalline acetaldehyde polymers, in contrast with the known amorphous polymers, are insoluble in acetone and in diethyl ether. It is therefore very easy to separate these crystalline polymers from the amorphous polymers by extraction with the aforementioned acetone or diethyl ether or with other solvents having similar properties.

By a series of extractions with various solvents having increasing solvent properties, it is possible to separate fractions having different degrees of crystallinity, due to the presence of chains having a partial regularity of structure (stereoblock polymers).

The acetaldehyde polymers not extractable with boiling acetone are highly crystalline, as indicated by X-ray examination, even in the case when the polymers are examined in the form of a non-oriented powder.

In the accompanying figure is shown the Geiger counter tracings of an acetone insoluble acetaldehyde polymer, prepared according to Example 1, taken using CuKα radiation.

The diffraction angles 2θ are plotted on the abscissae and the intensities, in a relative scale, are plotted as the ordinates.

From an observation of the figure, it is clear that the polymer has a very high degree of crystallinity.

The X-ray diffraction spectrum of oriented fibres of the polymer shows that the polymer is linear and has a high regularity of structure along the axis of the chain. More particularly, from an examination of these spectra, it is possible to conclude that there is present an identity period of about 4.8 A. along the axis of the chain and that the crystalline cell has a symmetry of the tetragonal type. The main chain of the polymer is apparently spiral and 4 monomeric units are contained in each identity period. The fact that these new crystallizable acetaldehyde polymers have an isotactic structure can be concluded from the X-ray diffraction spectra of these polymers.

The amorphous acetaldehyde polymers, which are soluble in acetone, and which either accompany the crystalline polymer or, in certain cases, constitute the whole polymerizate, consist of high molecular weight linear polymers and possess properties similar to those of a non-vulcanised elastomer.

It is also possible by operating according to the process of the present invention, to prepare new high molecular weight linear copolymers of acetaldehyde with formaldehyde.

These copolymeric products have interesting technological properties, which are different from those of the homopolymers.

The new crystallizable homopolymers provided by the present invention can be used in the manufacture of plastic materials, fibres and films, by employing the usual moulding and shaping methods.

The copoloymers of acetaldehyde with formaldehyde can be used in the elastomer field.

The following examples are given merely to illustrate the present invention and are not intended to be limiting thereof.

EXAMPLE 1

While operating under a nitrogen atmosphere, 25 cc. of acetaldehyde are introduced into a large test tube and are cooled to −78° C. After the addition of 0.5 cc. of a 10.4% solution of $Al(C_2H_5)_3$ in n-heptane, immediate polymerization is observed. After 40 minutes another 0.5 cc. of catalyst is added. After 6 hours, 1 cc. of triethylamine and 200 cc. of acetone are added. The temperature is thereupon allowed to rise to room temperature. A solid polymer is separated mechanically and washed with acetone. After drying this under reduced pressure, 6.2 g. of a white solid are obtained.

This solid polymer, either in the form of powder or of stretched fibres, gives an X-ray diffraction spectrum characteristic of crystalline polymers.

By extracting the polymer with boiling solvents under an atmosphere of nitrogen in a Kumagawa extractor, the fractions indicated in the following table are isolated.

TABLE 1

| Fraction | Extraction time, hours | Percent of total | Characteristics of the fractions |
|---|---|---|---|
| Acetone extract | 24 | 39 | Amorphous. |
| Diethyl ether extract | 24 | 4.5 | |
| Residue | | 56.5 | Crystalline. |

The residue is a white solid, shown to be highly crystalline by X-ray examination, and practically insoluble in benzene.

From the acetone extract a further 4.7 g. of a translucent polymer can be obtained by precipitation with water, mechanical separation and drying under reduced pressure.

The X-ray diffraction spectrum of this product is characteristic of amorphous products. Its intrinsic viscosity, in methyl ethyl ketone at 27.6° C., is 1.63 and corresponds to a molecular weight of about 350,000.

EXAMPLE 2

20 cc. of acetaldehyde are introduced into a large test tube and are diluted with 20 cc. of diethyl ether, while operating under a nitrogen atmosphere. The mixture is cooled to −78° C. and is polymerized by addition of 1 cc. of a 10.4% solution of $Al(C_2H_5)_3$ in n-heptane. After 8 hours, 20 cc. of acetone and 0.5 cc. triethyl amine are added. The temperature is then allowed to rise to room temperature. The ether is evaporated under vacuum, 50 cc. of acetone are added and the polymer is precipitated with water. After mechanical separation and drying the product at 50° C. under a pressure of 0.2 mm. of Hg., 7.1 g. of a plastic solid polymer are obtained. By extraction with boiling solvents under a nitrogen atmosphere in a Kumagawa extractor, the following fractions as shown in Table 2 are separated.

TABLE 2

| Fraction | Extraction time, hours | Percent of total | Characteristics of the fraction |
| --- | --- | --- | --- |
| Acetone extract | 24 | 25 | Amorphous. |
| Diethyl ether extract | 24 | 3 | |
| Residue | | 72 | Crystalline. |

The residue is a white solid, highly crystalline according to X-ray examination. By operating in a similar manner and using 10 cc. of acetaldehyde diluted with 25 cc. of methylene chloride, 1.85 g. of polymer containing about 10% of a crystalline fraction insoluble in acetone are obtained.

By operating in a similar manner, but using 10 cc. of acetaldehyde diluted with 50 cc. of toluene, 2.0 g. of a polymer containing about 50% of a crystalline, acetone insoluble fraction are obtained.

EXAMPLE 3

The polymerization is carried out operating in the manner of Example 1, but using 1.5 cc. of 2% $Al(C_2H_5)_2Cl$ solution in diethyl ether as a catalyst.

0.5 g. of a solid crystalline polymer, similar to that prepared in Example 1, and 2.8 g. of an amorphous, acetone soluble polymer, having an intrinsic viscosity of 0.63 (determined in methyl ethyl ketone at 27.6° C.) are obtained.

EXAMPLE 4

While operating under a nitrogen atmosphere, 40 cc. of acetaldehyde and 50 cc. of diethyl ether are introduced into a large test tube. The mixture is cooled to —78° C. Upon the introduction of 0.25 cc. of a 2% $Al(C_2H_5)Cl_2$ solution in diethyl ether, immediate formation of a gel takes place, which gel thickens slowly in the liquid.

After 20 hours, 150 cc. of acetone containing 0.25 β-naphthylamine are added and the temperature is allowed to rise to room temperature.

After removing most of the ether under vacuum, the polymer is precipitated with water by mechanical means.

After drying under a pressure of 0.2 mm. of Hg., 17.6 g. of an elastic, acetone soluble, linear polymer are obtained. The polymer is shown to be amorphous by the X-ray examination and has a molecular weight of about $4\times 10^5$. It has an intrisic viscosity ($\eta$) of 2.29 (determined in methyl ethyl ketone at 27.6° C.) This polymer remains unaltered at room temperature and depolymerizes noticeably only at temperatures above 80° C.

EXAMPLE 5

20 cc. of acetaldehyde are added to a solution of about 5 g. of formaldehyde in 50 cc. of diethyl ether (the formaldehyde being prepared by depolymerizing paraformaldehyde at 160° C. and condensing the formaldehyde thus formed at —78° C. in ethyl ether) and the mixture is kept at —78° C. Upon the addition of 1 cc. of 2% $Al(C_2H_5)_2Cl$ solution in diethyl ether, polymerization takes place immediately. After 17 hours, 25 cc. of acetone and 1 cc. of triethylamine are added and the temperature is allowed to rise to room temperature. The polymer is separated by precipitation with water and dried under a pressure of 0.2 mm. of Hg.

6.4 g. of a plastic white polymer are obtained.

3.4 g. of this polymer are extracted under a nitrogen atomosphere with boiling solvents in a Kumagawa extractor. Within 8 hours, acetone extracts 48% of the polymer and within 44 hours diethyl ether extracts 5% of the polymer. The residue, amounting to 52%, contains both the —CH$_2$—O— and the

groups. The infra-red spectrum of the polymer shows absorption bands at 4.93, 6.81 and 7.80μ and also at 6.92, 7.50 and 11.80μ. The residue is rather elastic and therefore has properties different from those of the acetaldehyde and formaldehyde homopolymers.

EXAMPLE 5

10 cc. of acetaldehyde are introduced into a large test tube and are cooled to —78° C., while operating under a nitrogen atmosphere. Upon the addition of 0.5 cc. of a 10% diethyl beryllium solution in n-heptane, polymerization is started. After 18 hours, the aldehyde is completely solidified. 30 cc. of acetone containing 1% of triethylamine and 0.5% of phenyl-β-naphthylamine are added and the polymer is precipitated with water. The polymer is mechanically separated and then dried at 50° C. under reduced pressure. 5.5 g. of a translucent, solid polymer, containing about 2% of a crystalline fraction not extractable with acetone, are obtained.

EXAMPLE 7

The polymerization is carried out by operating in the manner of the preceding example, but using 1 cc. of a 20% $Zn(C_4H_9)_2$ solution in n-heptane as a catalyst. Formation of the polymer takes place immediately. After 18 hours, the mass is completely solidified. 30 cc. of acetone containing 1% of triethylamine and 0.5% of phenyl-β-naphthylamine are added and the temperature is allowed to rise to room temperature.

The product is filtered and washed with acetone. After a drying under reduced pressure, 2.4 g. of an acetone insoluble, highly crystalline, solid polymer are obtained. There are only small amounts of the amorphous polymer present.

EXAMPLE 8

10 cc. of acetaldehyde and 20 cc. of anhydrous diethyl ether are introduced into a large test tube while operating under an atmosphere of nitrogen. The mixture is cooled to —78° C. and treated with 2 cc. of a 3 molar ether solution of $C_2H_5MgBr$. Polymerization takes place immediately. 20 cc. of acetone containing 1% of triethylamine and 0.5% of phenyl-β-naphthylamine are added. The temperature is allowed to rise to room temperature. The ether is evaporated, the product is treated with 50 cc. of methanol and is filtered and washed with acetone. After drying under reduced pressure, 1.5 of a solid acetone insoluble, highly crystalline polymer are obtained.

Upon precipitation with water of the acetone filtrate, 0.2 g. amorphous polymer are obtained.

Numerous variations can obviously be made without departing from the spirit of the present invention.

Having thus described the invention, what it is desired to secure and claim by Letters Patent is:

1. A solid elastic copolymer of acetaldehyde and formaldehyde.

2. A high-molecular weight linear copolymer of acetaldehyde and formaldehyde having a polyacetalic structure.

3. A method of preparing a high molecular weight linear copolymer of acetaldehyde and formaldehyde having a polyacetalic structure which comprises contacting the monomers at a temperature of about —50 to —100° C. with an organometallic catalyst prepared from the elements of Groups II and III of the Periodic Table.

4. The process of claim 3, further characterized in that the organometallic catalyst is an aluminum dialkyl monohalide.

5. The process of claim 4, further characterized in that the orangometallalic catalyst is aluminum dialkyl monochoride.

6. The method of claim 3, further characterized in that the organometallic catalyst is an aluminum trialkyl.

7. The method of claim 3, further characterized in that the organometallic catalyst is a monoalkyl aluminum dihalide.

8. The process of claim 3, further characterized in that the organometallic catalyst is a beryllium dialkyl.

9. The process of claim 3, further characterized in that the organometallic catalyst is an alkyl magnesium halide.

10. The process of claim 3, further characterized in that the organometallic catalyst is a zinc dialkyl.

11. The process of claim 3, further characterized in that the organometallic catalyst is a hydride.

References Cited

UNITED STATES PATENTS 2,848,437   8/1958   Langsdorf et al. _____ 260—67

OTHER REFERENCES

Conant et al., Jour. of Amer. Chem. Soc., vol. 54, No. 2 (1932), pp. 628–635.

Novak et al., Canadian Journal of Chem., vol. 37 (October 1959), pp. 1710–1721.

Novak et al., Faraday Soc. Transactions, vol. 55, No. 441 (September 1959), pp. 1484–1489.

Kunststaffe, vol. 53, July 1963, pp. 11–21, English translation of ibid., pp. 424–436.

Carruthers et al., Trans. Far. Soc., vol. 32, pp. 195–208 (1936).

Bevington et al., Proc. of the Royal Soc. (London), vol. A–196 (1949), pp. 363–378.

WILLIAM H. SHORT, *Primary Examiner.*

L. M. PAYNES, *Assistant Examiner.*

U.S. Cl. X.R.

260—32.8, 45.9.